Oct. 13, 1959

T. H. GLAZE ET AL 2,908,247

LIQUID SPRAYING APPARATUS

Filed April 3, 1956

INVENTORS
Tom H. Glaze and
William C. Shaver

BY Mason, Fenwick & Lawrence
ATTORNEYS

Oct. 13, 1959 T. H. GLAZE ET AL 2,908,247
LIQUID SPRAYING APPARATUS
Filed April 3, 1956 2 Sheets-Sheet 2

INVENTORS
Tom H. Glaze and
William C. Shaver
BY Mason, Fenwick & Lawrence
ATTORNEYS

United States Patent Office 2,908,247
Patented Oct. 13, 1959

2,908,247
LIQUID SPRAYING APPARATUS

Tom H. Glaze, Decatur, and William C. Shaver, Wayside, Ga., assignors to Gordy Air-Less Spray Company, Atlanta, Ga., a corporation of Georgia Application April 3, 1956, Serial No. 575,888

1 Claim. (Cl. 118—320)

This invention relates to liquid spraying apparatus and particularly to such apparatus wherein another fluid is used as the motive force for expelling the liquid to be sprayed.

In many fields it is desirable to spray a liquid, using a fluid medium for the power required to spray the liquid, and prevent any admixture of the liquid being sprayed and the propelling fluid. An example of this is in recapping tires, where the buffed, or rasped, tire carcass is sprayed with a liquid cement prior to putting on the new rubber. If air gets into the pressure cylinder there will be condensation with consequent difficulties due to water in the cement. In paint spraying for instance, water will cause imperfect bonding between the paint and the surface to which it is applied and blistering will result.

The primary object of the present invention is to provide spraying apparatus in which a fluid is used to spray a liquid, and the expelling fluid and the liquid being sprayed are maintained out of contact with one another.

Another object of the invention is to provide such apparatus wherein means are employed to provide a continuous spraying operation.

A further object is the provision of spraying apparatus employing separate chambers for the spraying liquid and the pressure fluid with means to prevent one fluid from entering the chamber of the other.

Yet another object is the provision of spraying apparatus which forms part of a supporting stand for the article to be sprayed.

Other objects of the invention will become apparent from the following description of one embodiment thereof, when taken in conjunction with the drawings which accompany, and form part of, this specification.

Figure 1:
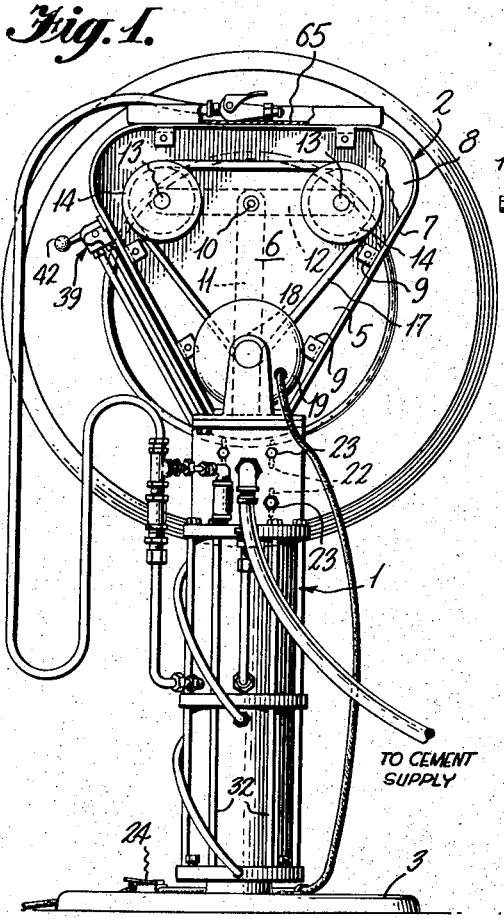
Figure 1 is a back view of a tire-supporting stand and sprayer incorporating the principles of the present invention.
Figure 2:
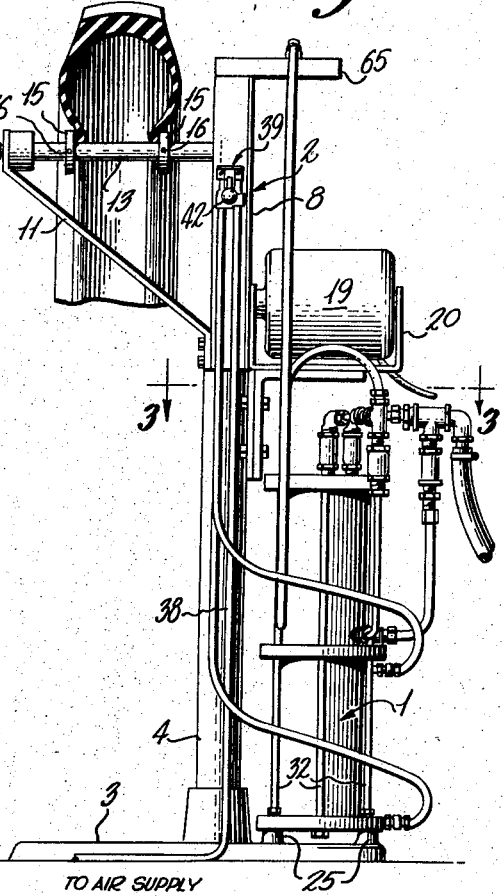
Figure 2 is a side view thereof.
Figure 3:
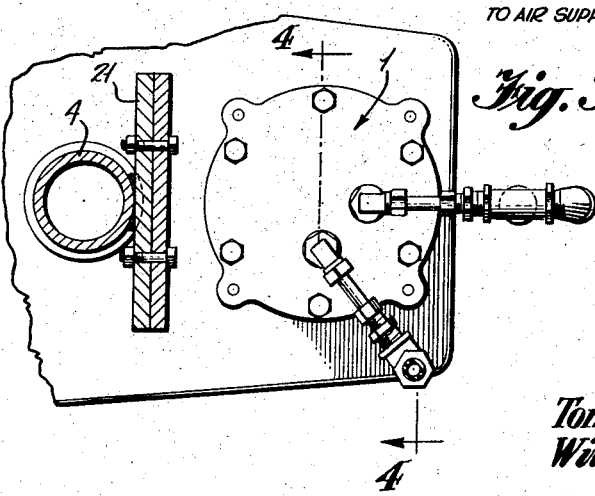
Figure 3 is a horizontal section through the device, taken on the line 3—3 of Figure 2.
Figure 4:
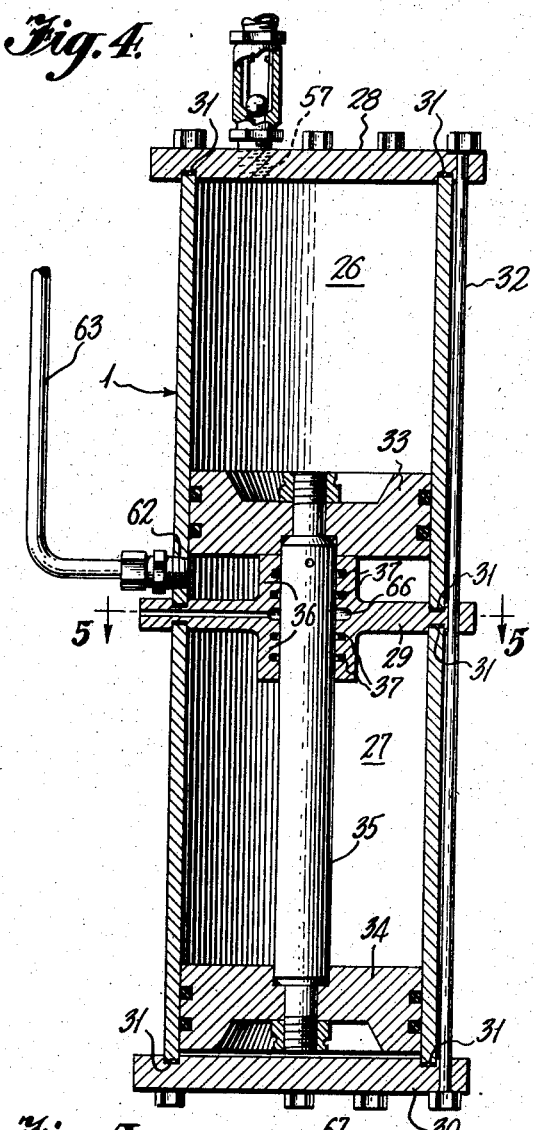
Figure 4 is a vertical section through the sprayer, taken on the line 4—4 of Figure 3.

In general, the invention consists of spraying apparatus in which the spraying pump forms a part of a support for the article to be sprayed, and the pump is double-acting, using a fluid as the pressure medium to expel the liquid to be sprayed, with the spray liquid and the pressure fluid being maintained out of contact with one another at all times.

Although it will be obvious as the description proceeds that the apparatus is suitable for spraying liquids of many types, the embodiment disclosed is particularly adapted for spraying liquid cement onto tire carcasses as a step in the recapping process.

Referring to the drawings in detail, spraying apparatus is shown which consists of a pump 1 mounted upon a tire-supporting and rotating stand 2.

The stand has a base 3, from which rises a pedestal 4. Seated upon the top of the pedestal, and bolted thereto, is housing 5, substantially triangular in shape. The housing consists of a back plate 6 having a peripheral flange 7. A cover plate 8 is screwed to brackets 9, fixed to the peripheral flange, to complete the housing.

A support rod 10 has one end fixed to the back plate of the housing and extends horizontally outward. Its outer end is supported by a bracket 11 which is secured to the housing 5. Rod 10, at its outer end, carries a transversely extending cross arm 12 in which the ends of tire-supporting spindles 13 are journaled. The spindles pass through the back plate of the housing 5 and pulleys 14 are mounted on the spindles within the housing 5. Each spindle carries a pair of collars 15 which can be fixed to the spindles by means of set screws 16 in any desired spaced relation, to engage the beads of a tire being sprayed. Pulleys 14 are driven by means of a belt 17, which also passes around a drive pulley 18 carried by a motor 19. The motor is supported upon a motor mount 20 bolted to a plate 21 welded to the pedestal 4 near its top. Plate 21 is provided with slots 22 and bolts 23, passing through the motor mount and the slots in the mounting plate, secure the motor in positions of vertical adjustment. Any suitable switch 24 may be used for controlling the operation of the motor. It will be obvious that when the motor is running and a tire is mounted on the spindles 13, the tire will be rotated so that all portions of the periphery will be brought in front of the operator.

The base of the tire-supporting stand is provided with a plurality of upstanding bosses 25 to form a seat for the pump 1. The pump may be bolted upon these bosses so as to become a permanent part of the apparatus.

The pump consists of a pair of cylinders 26, 27, arranged in axial alignment and closed by means of an upper head 28, an intermediate head 29 and a bottom head 30. Each of the heads is grooved to receive an end of one of the cylinders, and gaskets 31 are seated in the bottoms of the grooves so that fluid-tight connections will be made. The respective cylinders and heads are clamped in proper position by means of tie rods 32. For purposes of this discussion, the cylinder 26 will be referred to as the spray liquid cylinder and the cylinder 27 as the power cylinder.

A piston 33 is located within the spray liquid cylinder and a piston 34 is in the power cylinder. The two pistons are mounted upon a common piston rod 35 which connects the pistons and causes them to operate in unison. The length of the piston rod will be such that when one piston has reached one end of its cylinder the other piston will be at the same end of its cylinder. Intermediate head 29 is provided with oppositely extending bosses 36 which project into the cylinders 26 and 27 sufficient distances to provide an adequate bearing for the piston rod 35. Sealing rings 37 are mounted in the bosses in contact with the rod to prevent fluid in one cylinder from being carried over into the other cylinder during reciprocation of the piston rod.

Figure 6:
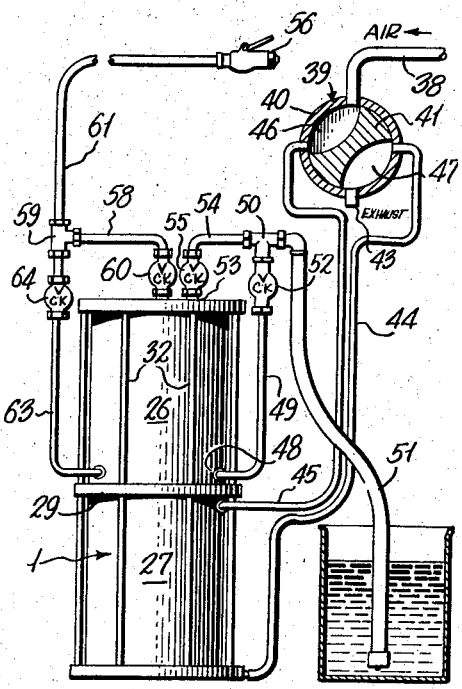
Figure 6 is a diagrammatic view of the sprayer with its pipe system for propelling fluid and spraying liquid and the controls therefor.
Figure 5:
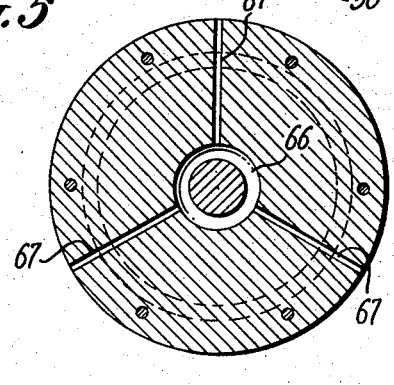
Figure 5 is a horizontal section through the intermediate cylinder head of the sprayer and is taken on the line 5—5 of Figure 4.

Piston 34 in the power cylinder is caused to move by means of compressed air. The air is piped into the cylinder from a suitable source of supply (not shown) through an air inlet pipe 38 to a control valve 39. The control valve may be of any conventional type which will provide for a reversal of air flow to opposite ends of the cylinder 27 and may be conveniently mounted on the side of housing 5. A conventional valve is shown in Figure 6, having a casing 40 and a barrel 41 which may be rotated by means of a handle 42. The casing has four ports, to one of which is connected the inlet pipe 38. Another of the ports, 43, will function as an air outlet, and the other two will be connected respectively to the air lines 44 and 45 which are tapped into the opposite ends of the cylinder 27. As shown, the air line 44 is connected to the bottom of the cylinder 27 and the air line 45 near the top of that cylinder. When the barrel 41 is rotated so that its bridging port 46 connects the air line 44 with the inlet 38, air will flow into the bottom of cylinder 27 and force the piston upward. At the same time the bridging port 47 in the barrel 41 will connect the air line 45 with the outlet 43 so that air in the cylinder above the piston will be exhausted. It will be obvious that when the control handle 42 is moved the port 46 will then connect the air line 45 to the air inlet 38 and the air line 44 to the outlet 43, thus causing the piston to move downward.

The movement of the piston 34 will obviously cause similar movement of the piston 33. When cylinder 26 is empty, movement of piston 33 will draw in a supply of liquid on its first stroke. If the initial movement of piston 33 is upward, there will be a vacuum created behind the piston, between the piston and the intermediate head 29, which will draw in liquid through a liquid supply port 48 in the wall of the cylinder adjacent the intermediate head. A supply line 49 connects port 48 with a T-fitting 50, and a hose line 51, which can be dropped in any suitable supply of liquid to be sprayed, is coupled to the T-fitting. A check valve 52 which opens under vacuum at the port 48 is connected into line 49 between the port and the T-fitting. When the piston 33 moves downwardly, a vacuum will be drawn between the piston and upper head 28. A supply port 53 in the upper head, connected by a supply line 54 to the T-fitting 50, permits liquid to be drawn in. A check valve 55, opening under vacuum at port 53, is coupled in line 54.

A similar system is used to carry the liquid from cylinder 26 to a spray nozzle 56. An outlet port 57 in the upper cylinder head is connected to an outlet line 58 which is coupled to a T-fitting 59. A check valve 60 forms part of line 58 and opens under pressure at port 57. The spray nozzle is coupled to a flexible hose 61, which has its opposite end connected to the T-fitting 59. There is also a lower outlet port 62 in the cylinder 26 adjacent the intermediate head 29, and this port is connected by line 63 to the T-fitting 59. A check valve 64, openable when pressure is at the port 62, is connected into line 63.

With the above described sysem of ports and pipe lines, the sprayer will have continuous action. After the cylinder is filled with liquid and assuming that piston 33 is at the top of cylinder, the air control valve 39 will be moved to connect the air line 45 with the line 38 to admit air to the top of cylinder 27. Both pistons will move downwardly. Piston 33 will exert pressure upon the liquid in cylinder 26 which will cause inlet check valve 52 to close and check valve 64 in the outlet line 63 to open. This will cause liquid to be forced to and through the spray nozzle. At the same time, the downward movement of piston 33 will draw a vacuum behind it, closing check valve 60 in outlet line 58 and opening check valve 55 in line 54 so that liquid will be drawn into the cylinder above the piston. When the piston 33 reaches its lowest position, the air valve is reversed and the pistons move upwardly. The reversal of pressure and vacuum forces in cylinder 26 will cause check valves 64 and 55 to close and valves 52 and 60 to open so that liquid above the piston will be forced out to the spray nozzle and a fresh supply of liquid will be drawn into the cylinder below the piston.

The spray nozzle will be held by the operator when in use, and may be conveniently laid in a tray 65 on top of housing 5 when not in use.

In order to assure complete separation of the spraying liquid and power fluid at all times, the bearing in the intermediate head through which the piston rod slides is sealed off by the O rings 37, previously mentioned. These rings are located in the bosses 36 which project into the respective cylinders so that they are adjacent the outer ends of the bosses. At times, however, due to the high pressures in the cylinders, some leakage past the O rings may occur. To prevent any possibility of leaked liquid reaching the opposite cylinder, a collecting groove 66 is formed in the intermediate head 29 encircling the piston shaft. Drainage ports 67 extend radially from the groove to the periphery of the intermediate head. This drainage system will permit any fluid which might leak by the rings 37 to escape. It will be noted particularly that the pressures set up in the respective cylinders will counteract one another so as to force leaking fluid to the center of the intermediate head. When the air pressure is above the lower piston 34 and therefore against the central seal, the liquid in the upper cylinder below the piston 33 will be exerting an equal pressure against the seal. Thus, if fluid leaks by the O rings at either side, equal pressure against the seal from both sides will prevent it from getting beyond the drainage groove.

While in the above one practical embodiment of the invention has been disclosed, it will be understood that the specific structural details described and shown are merely by way of example, and the invention may take other forms within the scope of the appended claim.

What is claimed is:

Liquid spraying apparatus comprising, a support, a housing mounted on said support, a pair of horizontally spaced spindles journalled in said housing and projecting therefrom to support an article to be sprayed, means carried on said support to rotate said spindles to rotate articles supported thereon during spraying, and a liquid pump carried by said support, said pump comprising a pair of axially aligned cylinders, pistons in said cylinders, a common piston rod connecting said pistons, means for admitting a driving fluid into one of said cylinders, means for admitting liquid to be sprayed in the other of said cylinders, a spray nozzle tipped outlet hose connected to said cylinder receiving liquid to be sprayed, a common head intermediate said cylinders and having an opening therein through which said piston rod passes, sealing rings near the end of said opening in said intermediate head about said piston rod, said intermediate head having a collecting groove therein centrally between said sealing rings and about said opening, and a plurality of ports extending from said collecting groove to atmosphere.

References Cited in the file of this patent

UNITED STATES PATENTS

| | | |
|---|---|---|
| 1,250,423 | Boyden | Dec. 18, 1917 |
| 1,790,982 | Gamer | Feb. 3, 1931 |
| 1,850,238 | Maynard | Mar. 22, 1932 |
| 2,060,180 | Davis | Nov. 10, 1936 |
| 2,699,120 | Schweisthal | Jan. 11, 1955 |